(12) United States Patent
Buchholtz (10) Patent No.: US 7,457,387 B2
(45) Date of Patent: Nov. 25, 2008

(54) METHOD FOR GENERATING TRANSMITTER CLOCK

(75) Inventor: Timothy Clyde Buchholtz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 11/181,715

(22) Filed: Jul. 14, 2005

(65) Prior Publication Data

US 2007/0014388 A1    Jan. 18, 2007

(51) Int. Cl.
*H04L 7/00* (2006.01)
(52) U.S. Cl. ..................................... 375/354
(58) Field of Classification Search ................ 375/354, 375/377, 371; 713/500; 327/141, 144
See application file for complete search history.

(56) References Cited

U.S. PATENT DOCUMENTS

2004/0119521 A1* 6/2004 Kurd et al. .................. 327/291
2004/0236977 A1* 11/2004 Kizer et al. ................. 713/500

* cited by examiner

*Primary Examiner*—David C. Payne
*Assistant Examiner*—Rahel Guarino
(74) *Attorney, Agent, or Firm*—Joan Pennington (57) ABSTRACT

A transmit clock generator includes a first local clock generator and a second local clock generator, each receiving an external PLL clock signal and respectively generating first and second divided clock signals. A synchronization signal is applied to the first local clock generator and second local clock generator during a clock training period to enforce a phase relationship between the first and second divided clock signals. The synchronization signal includes at least one synchronization pulse that is applied to the first local clock generator and second local clock generator during the clock training period.

2 Claims, 8 Drawing Sheets

METHOD FOR GENERATING TRANSMITTER CLOCK

FIELD OF THE INVENTION

The present invention relates generally to the data processing field, and more particularly, relates to a method of clock generation for a transmitter and a transmit clock generator.

DESCRIPTION OF THE RELATED ART

Integrated circuits forming a system-on-a-chip (SoC) typically utilize serial links to provide chip-to-chip interconnects in high-speed network systems. Such links often define a Front Side Bus (FSB) that includes a slower link layer that interfaces to a higher speed physical (PHY) layer. The PHY typically consists of a plurality of transmitter (Tx) cores that receive parallel data streams from the link layer and serially launch this data off-chip over the transmission media. System clocking is normally provided externally using a phase locked loop (PLL). A probable scenario would be to provide quarter rate clocks to the link layer operating at 1.35 GHz and full rate clocks to the PHY operating at 5.4 GHz. Since the same PLL provides both sets of clocks the clocks are frequency synchronous but the phase relationship between them is unknown.

As a result an asynchronous interface must first be handled before the parallel data sent from the FSB link layer can be reliably received by the PHY Tx cores. This function is performed by the Tx clock generator that must create local phase synchronous versions of the quarter rate link layer clock. These local clocks are then used to capture, serialize, and then transmit the data off-chip. In the scenario described previously a local half rate clock operating at 2.7 GHz and phase synchronous to the full rate PHY clock captures incoming data. An additional local phase synchronous quarter rate clock assists in the serialization and the data is then transmitted using both transitions of the previous local half rate clock, producing a serial data rate of 5.4 Gbps across the link. Disadvantages of conventional arrangements for creating these local phase synchronous clocks include the inherent circuit complexity required for generating multiple waveform sets for phase synchronization and for generating training sequences. Such conventional arrangements require excessive hardware for dual waveform construction and associated multiplexing and control, and for training closure.

A need exists for an improved transmitter (Tx) clock generation technique for creating the local phase synchronous clocks required to capture, serialize, and transmit the incoming parallel data from the FSB link layer.

SUMMARY OF THE INVENTION

Principal aspects of the present invention are to provide a method of clock generation for a transmitter and a transmit clock generator. Other important aspects of the present invention are to provide such method of clock generation for a transmitter and a transmit clock generator substantially without negative effect and that overcome many of the disadvantages of prior art arrangements.

In brief, a transmit clock generator and a method of clock generation for a transmitter are provided. A first local clock generator and a second local clock generator receiving an external PLL clock signal and respectively generating first and second divided clock signals. A synchronization signal is applied to the first local clock generator and second local clock generator during a clock training period to enforce a phase relationship between the first and second divided clock signals. The synchronization signal includes at least one synchronization pulse that is applied to the first local clock generator and second local clock generator during the clock training period.

In accordance with features of the invention, the synchronization signal is generated using a data clock sampler that receives and samples a data synchronous clock signal, referred to as data_sample, that is derived from a link layer clock, and sampled by the external full rate PLL clock. Sample outputs of the data clock sampler are applied to a synchronization pulse generator that detects rising edge samples from the data clock sampler and outputs rising edge synchronization pulses. A gated synchronization repower tree repowers the rising edge synchronization pulses. A synchronization control signal generated by a clock synchronization control gates the gated synchronization repower tree to allow at least one synchronization pulse to be applied to the first local clock generator and second local clock generator only during the clock training period.

In accordance with features of the invention, the clock training period is established by the clock synchronization control responsive to an applied reset signal indicating proper power to the transmitter has been established and no reset conditions are pending and an applied input indicating valid synchronization pulses are being produced.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
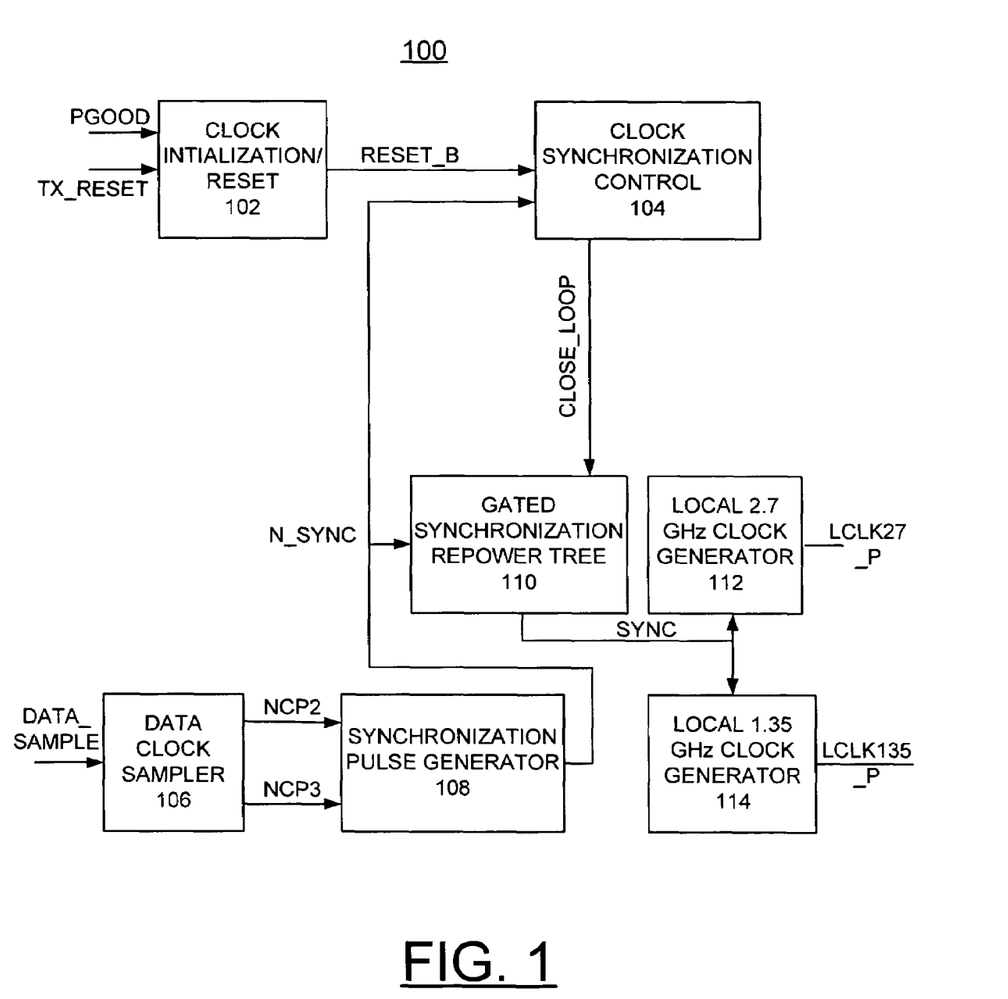
FIG. 1 is a block diagram illustrating an exemplary transmit clock generator in accordance with the preferred embodiment.

Having reference now to the drawings, in FIG. 1, there is shown an exemplary transmit clock generator generally designated by the reference character 100 in accordance with the preferred embodiment. Transmit clock generator 100 is illustrated and described for a link layer data rate of 1.35 GHz (¼×) and a sampling data rate of 5.4 GHz (1×); however, it should be understood that principles of the present invention are applicable to various other link layer and sampling data rates.

In accordance with features of the transmit clock generator of the preferred embodiment, advantages include: 1) Robustness, the new method of clock generation implemented by transmit clock generator 100 is insensitive to the duty cycle of the DATA_SAMPLE clock, such as a Front Side Bus (FSB) 1.35 GHz link layer clock and provides an enhanced and dependable training closure scheme. 2) Simplicity, the new method of clock generation requires less hardware than conventional arrangements since it avoids dual waveform construction and associated multiplexing and control, and simpler training closure hardware. 3) Flexibility, the new method of clock generation enables the use a wider range of DATA_SAMPLE frequencies. 4) Extendibility, the new method of clock generation easily supports additional levels of serialization by adding additional local clock generators, sharing common synchronization signals.

Figure 4:
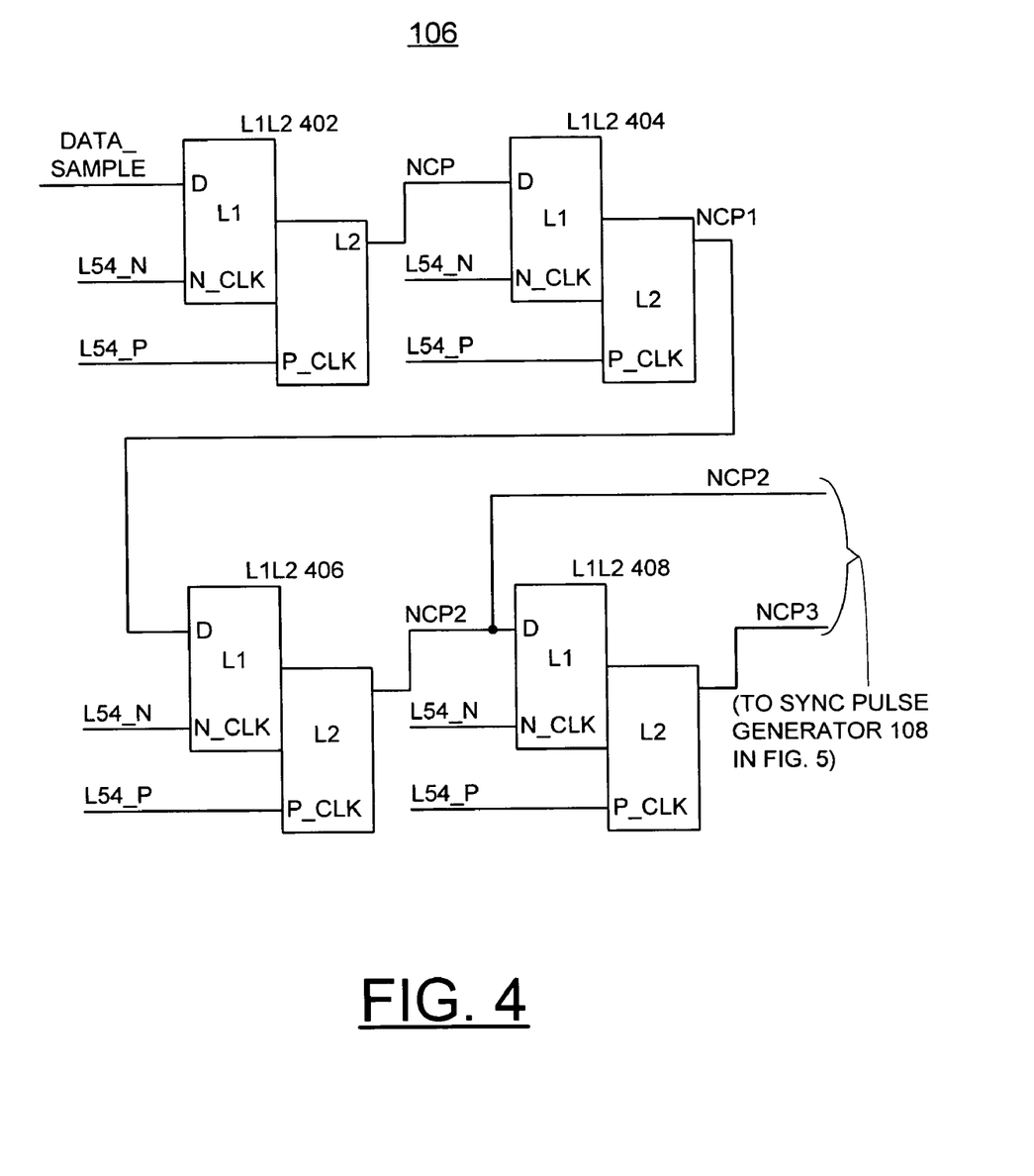
FIG. 4 illustrates an exemplary data clock sampler functional block of the exemplary transmit clock generator of FIG. 1 in accordance with the preferred embodiment.

In accordance with features of the preferred embodiment, clock synchronization is provided within a narrow time window, or training period, during system power on. Transmit clock generator 100 samples an incoming clock, with frequency ¼× (1.35 GHz) and phase y, with a sampling clock of frequency 1× (5.4 GHz) and a phase z, once each cycle of the sampling clock. The incoming clock, shown as DATA_SAMPLE in FIG. 1, is sampled at both its high value and low value provided the sampling does not occur during a rising or falling transition which could fall in the metastable region of the sampling clock. However, if the sampling does occur within the metastable region of the sampling clock this sample is still retained since the new transition value has been either just captured or just missed. If the new transition value was just missed, a new transition value will be captured in the next cycle of the sampling clock so that the sampling accuracy is within one cycle of the sampling clock. In the transmit clock generator 100 metastability is resolved by double latching the sampled waveforms, as shown in FIG. 4 using an L1L2 latch pair.

In accordance with features of the preferred embodiment, transmit clock generator 100 performs a rising edge detect on the incoming clock and so is insensitive to its duty cycle. Transmit clock generator 100 does not rely upon repetitive periodic waveforms to produce reliable local clocks and avoids the use of multiple data clock samplers which guard against making clock synchronization decisions based on potentially metastable sampling of the DATA_SAMPLE clock. Such conventional schemes often require additional hardware to produce multiple chains of sampling latches, delay elements, comparison logic, and the extra multiplexing needed to select proper DATA_SAMPLE clock samples for clock synchronization. Transmit clock generator 100 only relies on rising edge transitions of the incoming DATA_SAMPLE and since it needs only one valid synchronization pulse to train the local clock generators, it is capable of using an incoming DATA_SAMPLE at the ¼× frequency or a frequency that has been divided down, say ⅛× or ¹⁄₁₆×.

As shown in FIG. 1, the transmit clock generator 100 includes multiple functional blocks including a Clock Initialization/Reset 102, a Clock Synchronization Control 104, a Data Clock Sampler 106, a Synchronization Pulse Generator 108, a Gated Synchronization Repower Tree 110, a Local 2.7 GHz Clock Generator 112, and a Local 1.35 GHz Clock Generator 114.

A power good signal PGOOD and a transmit reset signal TX_RESET are applied to the Clock Initialization/Reset 102, which generates an output reset signal RESET_B. Until the Clock Initialization/Reset 102 receives an active PGOOD signal or as long as there is a pending TX_RESET, transmit clock generator 100 remains in a synchronization mode and will train the local serialization clocks 112, 114, synchronizing the local serialization clocks with applied differential 5.4 GHz PLL clock inputs that are generated external to the transmit clock generator 100. This condition forces the output of the Clock Initialization/Reset 102, RESET_B, to be low. When an active PGOOD signal is received and when there is no outstanding TX_RESET then the output of the Clock Initialization/Reset 102, RESET_B, goes high.

As shown in FIG. 1, the Clock Synchronization Control 104 receives the output of the Clock Initialization/Reset 102, RESET_B and an output N_SYNC of the Synchronization Pulse Generator 108 and generates an output signal CLOSE_LOOP that indicates when the clock synchronization loop is able to be closed. Clock Synchronization Control 104 is used to determine whether the transmit clock generator 100 needs to continue sampling the DATA_SAMPLE clock using Data Clock Sampler 106 to generate synchronization pulses to train the Local 2.7 GHz (½×) Clock Generator 112 and the Local 1.35 GHz (¼×) Clock Generator 114 or whether these local clocks have already been properly synchronized.

The output signal RESET_B from the Clock Initialization/Reset 102 indicates that proper power has been established and that no reset conditions are pending. The output signal N_SYNC from the Synchronization Pulse Generator 108 indicates that valid synchronization pulses are being produced. This information is used to generate the output signal CLOSE_LOOP that is applied to the Gated Synchronization Repower Tree 110 which generates synchronization pulses applied to the Local 2.7 GHz (½×) Clock Generator 112 and the Local 1.35 GHz (¼×) Clock Generator 114.

The Synchronization Pulse Generator 108 is responsive to the rising edge samples of the DATA_SAMPLE and, when detected, outputs latched, active-high sync pulses via the Gated Synchronization Repower Tree 110 that are 1 unit-interval (UI) in duration, where a UI is defined as the period of the 5.4 GHz clock. These sync pulses SYNC serve two purposes, to synchronize clocks to be used to capture, serialize, and transmit the link layer data and handshaking to indicate that synchronization has been completed. Properly serializing the raw link layer data requires that the frequency dividers indicated in the Local 2.7 GHz Clock Generator 112 and the Local 1.35 GHz Clock Generator 114 are not only frequency synchronous with the local 5.4 GHz PLL clocks but also phase determinate. The Sync Pulse Generator 108 via the Gated Synchronization Repower Tree 110 feeds these dividers of the Local 2.7 GHz Clock Generator 112 and the Local 1.35 GHz Clock Generator 114 and forces the required phase relationships, possibly overriding previously established relationships.

When the output signal CLOSE_LOOP indicates that the clock synchronization loop is still open, synchronization pulses are sent to the Local 2.7 GHz (½×) Clock Generator 112 and the Local 1.35 GHz (¼×) Clock Generator 114 to force these local clock generators that are already frequency synchronous with the 5.4 GHz PLL clock inputs to also be phase determinate. The phase relationship between the Local 2.7 GHz Clock Generator 112 and the Local 1.35 GHz Clock Generator 114 is important to properly serialize the parallel data received from the FSB link layer. The clocks of the Local 2.7 GHz Clock Generator 112 and the Local 1.35 GHz Clock Generator 114 are generated using frequency dividers, clocked by the 5.4 GHz PLL clocks, as illustrated and described with respect to FIGS. 7 and 8.

Figure 2:
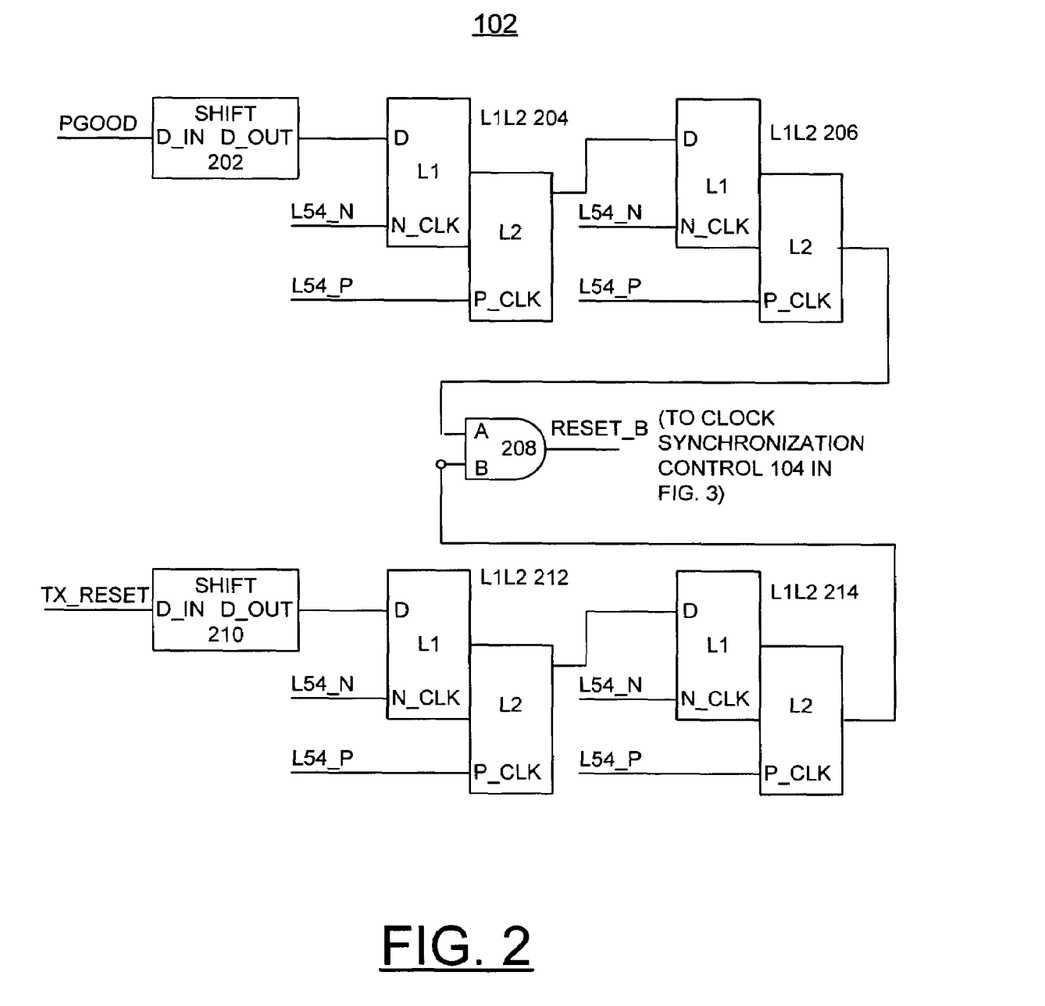
FIG. 2 illustrates an exemplary clock initialization/reset functional block of the exemplary transmit clock generator of FIG. 1 in accordance with the preferred embodiment.

Referring now to FIG. 2, there is shown an exemplary clock initialization/reset functional block 102 of the transmit clock generator 100 in accordance with the preferred embodiment. Clock Initialization/Reset functional block 102 is formed by a level shifter 202 receiving the PGOOD signal and coupled by a first L1L2 latch pair 204 and a second L1L2 latch pair 206 to a first input of a two input AND gate 208. The TX_RESET signal is applied to a level shifter 210 and coupled by a first L1L2 latch pair 212 and a second L1L2 latch pair 214 to a second inverting input of the two input AND gate 208. Externally generated differential 5.4 GHz PLL clock inputs labeled L54_N, L54_P are applied to respective clock inputs of the L1L2 latch pairs 204, 206, 212, 214. The AND gate 208 provides the output signal RESET_B of the Clock Initialization/Reset 102. The level shifters 202 and 210 optionally are provided for voltage level shifting where needed when the link layer and physical layer have different voltage domains. The PGOOD signal is applied to the L1L2 latch pair 204 and similarly the TX_RESET signal is applied to the L1L2 latch pair 212, when the optional level shifters 202 and 210 are eliminated.

Figure 3:
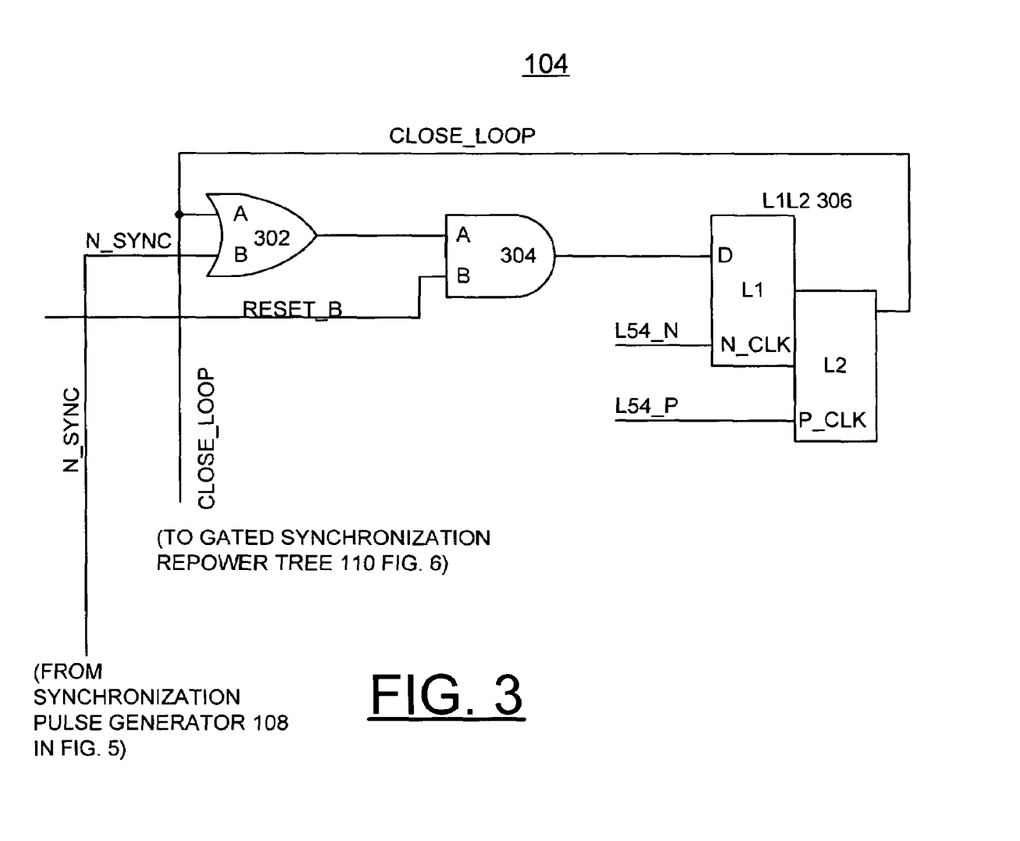
FIG. 3 illustrates an exemplary clock synchronization control functional block of the exemplary transmit clock generator of FIG. 1 in accordance with the preferred embodiment.

Referring now to FIG. 3, there is shown an exemplary Clock Synchronization Control functional block 104 of the transmit clock generator 100 in accordance with the preferred embodiment. Clock Synchronization Control 104 is formed by a two input OR gate 302 coupled to a two input AND gate 304 coupled to an L1L2 latch pair 306 providing the output signal CLOSE_LOOP. OR gate 302 receives the N_SYNC output of the Synchronization Pulse Generator 108 and feedback of the generated output signal CLOSE_LOOP. AND gate 304 receives the output of OR gate 302 and the output signal RESET_B from the Clock Initialization/Reset 102. The output of AND gate 304 is applied to the L1 latch of the L1L2 latch pair 306. The externally generated differential 5.4 GHz PLL clock inputs L54_N, L54_P are applied to respective clock inputs of the L1L2 latch pair 306 that provides the output signal CLOSE_LOOP at the L2 latch output.

Referring now to FIG. 4, there is shown an exemplary Data Clock Sampler functional block 106 of the transmit clock generator 100 in accordance with the preferred embodiment. Data Clock Sampler 106 includes a plurality of series connected L1L2 latch pairs 402, 404, 406, 408, each clocked at the externally generated differential 5.4 GHz PLL clock inputs.

A clock input, derived from the link layer clock and sharing the same timing relationship with respect to the link layer clock as the raw, unserialized link layer data, shown as DATA_SAMPLE, is applied as an input to the Data Clock Sampler 106 to the master L1 latch of the first latch pair 402. The Data Clock Sampler 106 also receives a frequency synchronous sampling clock, which is for example, a repowered copy of the external differential 5.4 GHz PLL clock. The sampled DATA_SAMPLE, at the NCP2 output of L1L2 latch pair 406 and the NCP3 output of L1L2 latch pair 408, is directed to the Synchronization Pulse Generator 108, which performs a rising edge detection.

During a training period the Data Clock Sampler 106 performs a 4× or greater over-sampling of the 1.35 GHz or slower DATA_SAMPLE input clock using a sampling latch clocked at 5.4 GHz. Since the DATA_SAMPLE input shares the same timing relationships as the raw data received from the link layer, this is equivalent to actually sampling the raw data itself and creating synchronous clocks that will be used to capture, serialize, and transmit the raw data in the Tx first-in first-out registers (FIFOs) and drivers (not shown). The sampling L1 latch of the Data Clock Sampler 106 is the first L1 (master) sampling latch of latch pair 402 that captures the DATA_SAMPLE input. The remaining latches L2 of the first latch pair 402, and L1L2 latch pairs 404, 406, 408 are used in pipelining the samples and to filter out any metastable effects resulting when the asynchronous DATA_SAMPLE input arrives in the metastable region of the L1 sampling latch. To eliminate sensitivity to the duty cycle of the link layer clock, the only samples of interest are in the region of rising DATA_SAMPLE transitions, correspondingly rising link layer clock transitions, which signal the beginning and subsequent end of a raw data cycle. If the rising DATA_SAMPLE edge occurs within the metastable region of the L1 sampling latch 402 the value of the sample is indeterminate and this leads to a quantization error of at most 1 UI. Since the raw data cycle itself is only 4 UI wide, this 1 UI quantization error needs to be accounted for in balancing the overall setup and hold margins when latching the raw data to be serialized in the Tx FIFOs.

Figure 5:
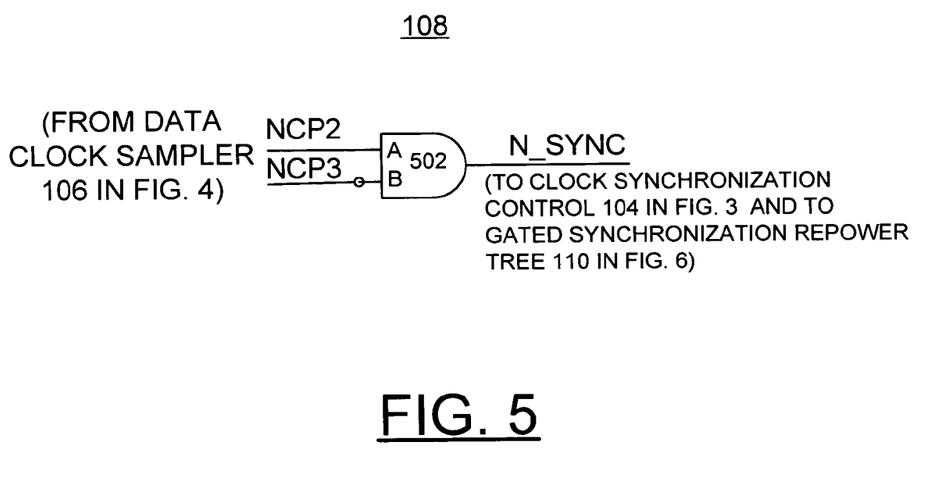
FIG. 5 illustrates an exemplary synchronization pulse generator functional block of the exemplary transmit clock generator of FIG. 1 in accordance with the preferred embodiment.

Referring now to FIG. 5, there is shown an exemplary Synchronization Pulse Generator functional block 108 of the transmit clock generator 100 in accordance with the preferred embodiment. Synchronization Pulse Generator 108 includes a two input AND gate 502 that receives the NCP2 output of L1L2 latch pair 406 and receives and inverts the NCP3 output of L1L2 latch pair 408 of the Data Clock Sampler 106. The ANDED outputs NCP2 and inverted NCP3 provide the N_SYNC of the Synchronization Pulse Generator 108.

Figure 6:
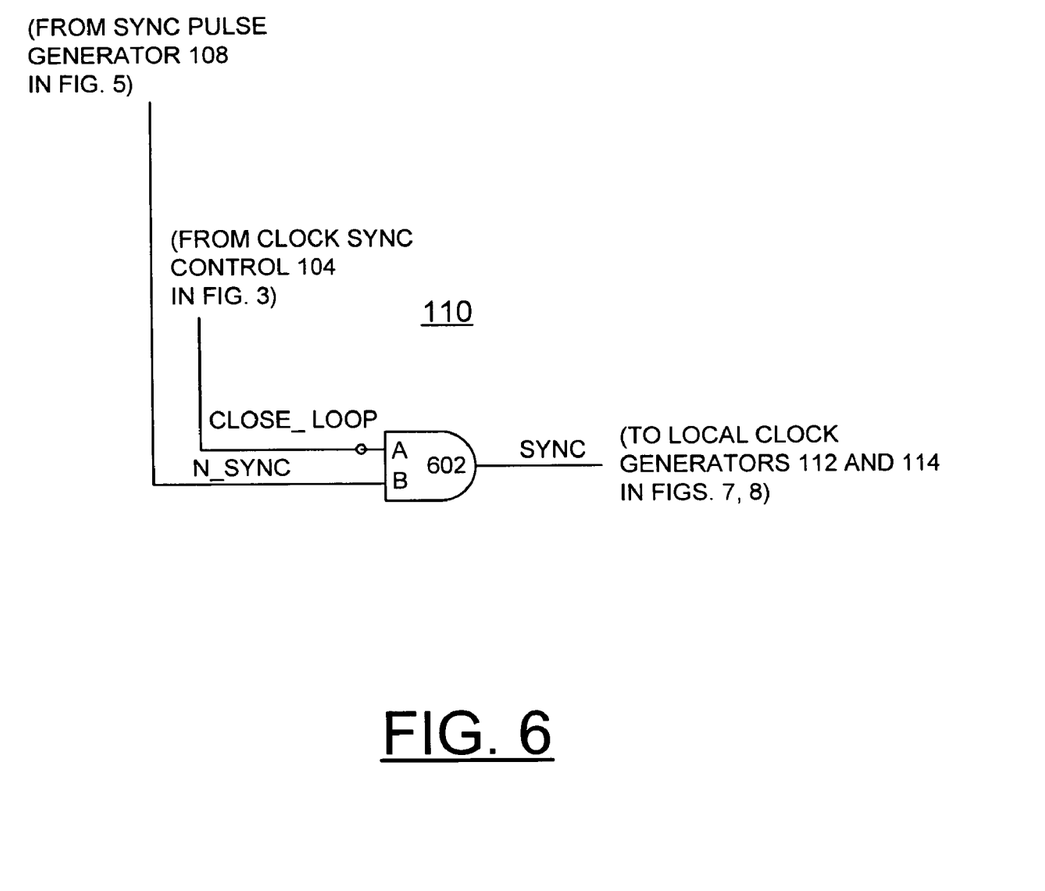
FIG. 6 illustrates an exemplary gated synchronization repower tree functional block of the exemplary transmit clock generator of FIG. 1 in accordance with the preferred embodiment.

Referring now to FIG. 6, there is shown an exemplary Gated Synchronization Repower Tree functional block 110 of the transmit clock generator 100 in accordance with the preferred embodiment. Gated Synchronization Repower Tree 110 includes a two input AND gate 602 receiving the N_SYNC of the Synchronization Pulse Generator 108 and receiving and inverting the CLOSE_LOOP output of the Clock Synchronization Control 104 that together define the synchronization training period. The ANDED outputs N_SYNC and inverted CLOSE_LOOP provide the SYNC pulse output of AND gate 602 that is applied to the local clock generators 112 and 114.

The rising edge synchronization pulses N_SYNC output of the Synchronization Pulse Generator 108 are then repowered in the Gated Synchronization Repower Tree 110, where they are also gated by a synchronization control signal output CLOSE_LOOP, provided by the Clock Synchronization Control 104, that only allows synchronization pulses to be sent to the local clock generation blocks 112, 114 if the clock synchronization loop is open.

When an active PGOOD signal is received and when there is no outstanding TX_RESET the first sync pulse N_SYNC sent to the Clock Sync Control 104 under these conditions activates the CLOSE_LOOP control signal that will gate off the Gated Synchronization Repower Tree 110, preventing subsequent SYNC pulses from being generated. The control loop terminates the training based upon valid power, the absence of any Tx resets, and the receipt of at least one valid synchronization pulse. This keeps the 2.7 GHz and 1.35 GHz frequency dividers of the local clock generators 112 and 114 in a free running state where they retain the phase relationships dictated by the last received sync pulse during the training period.

Figure 7:
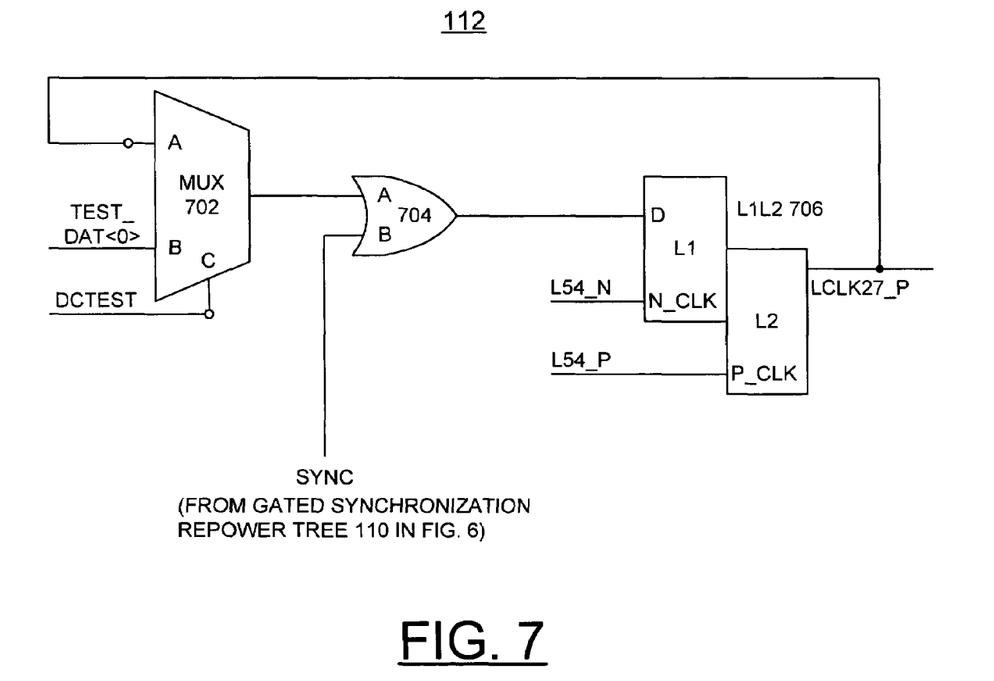
FIG. 7 illustrates an exemplary half rate local 2.7 GHz clock generator functional block of the exemplary transmit clock generator of FIG. 1 in accordance with the preferred embodiment.

FIG. 7 illustrates an exemplary Local 2.7 GHz Clock Generator functional block 112 of the transmit clock generator 100 in accordance with the preferred embodiment. Local 2.7 GHz Clock Generator 112 includes a frequency divider defined by a multiplexer 702 used for testing coupled to a two input OR gate 704 coupled to an L1L2 latch pair 706 with the clock output labeled LCLK27_P of the L2 latch fed back to a first input of multiplexer 702. The SYNC output of the Gated Synchronization Repower Tree 110 is applied to an input of OR gate 704. The external differential 5.4 GHz PLL clock drives the L1L2 latch pair 706 that create the half rate frequency or 2.7 GHz output LCLK27_P.

Figure 8:
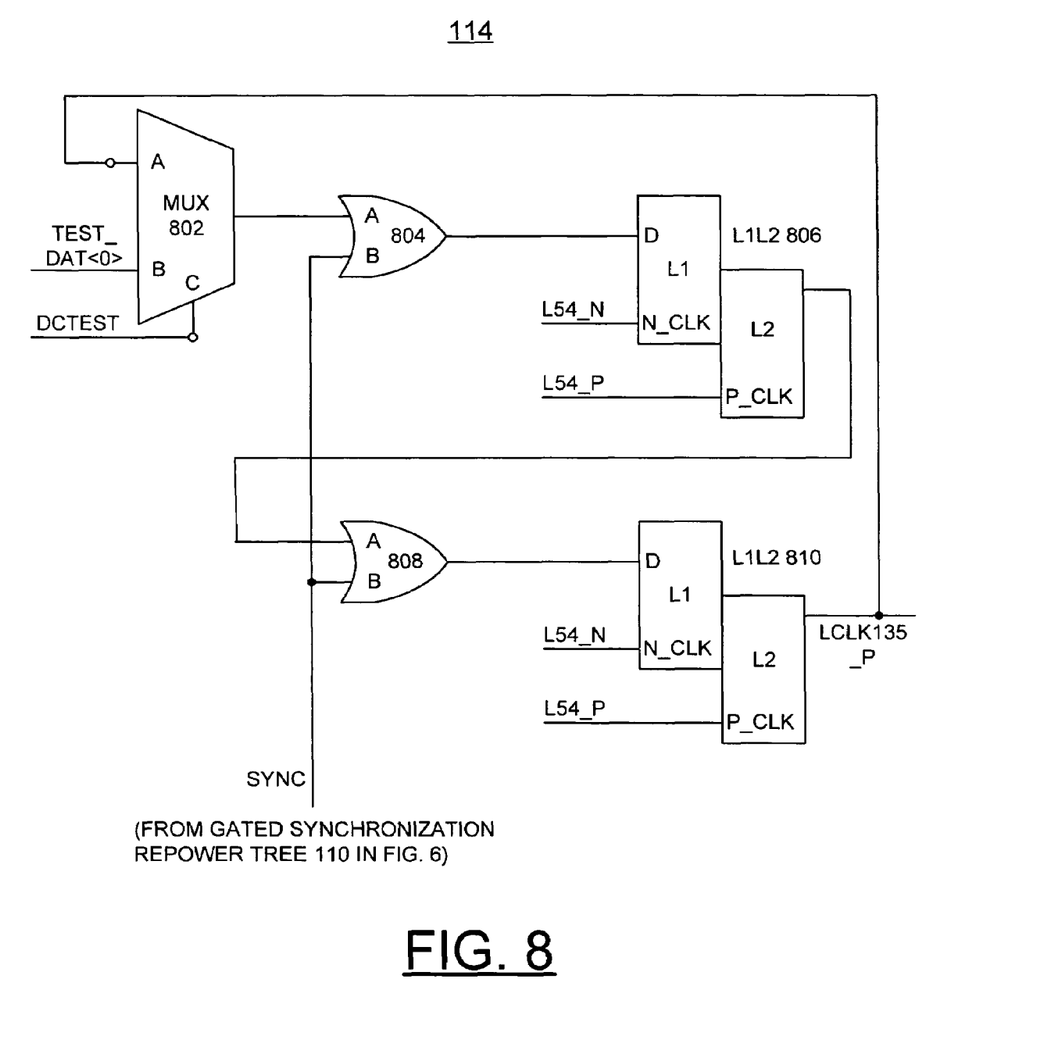
FIG. 8 illustrates an exemplary quarter rate local 1.35 GHz clock generator functional block of the exemplary transmit clock generator of FIG. 1 in accordance with the preferred embodiment.

FIG. 8 illustrates an exemplary Local 1.35 GHz Clock Generator functional block of the transmit clock generator 100 in accordance with the preferred embodiment. Local 1.35 GHz Clock Generator 114 includes a frequency divider defined by a multiplexer 802 used for testing coupled to a first two input OR gate 804 coupled to an L1L2 latch pair 806. The L1L2 latch pair 806 is coupled to a second two input OR gate 808 coupled to an L1L2 latch pair 810 with the clock output labeled LCLK135_P of the L2 latch fed back to a first input of multiplexer 802. The SYNC output of the Gated Synchronization Repower Tree 110 is applied to an input of the OR gates 804, 808. The external differential 5.4 GHz PLL clock drives the L1L2 latch pairs 806, 810 that create the quarter rate frequency or 1.35 GHz output LCLK135_P.

While the present invention has been described with reference to the details of the embodiments of the invention shown in the drawing, these details are not intended to limit the scope of the invention as claimed in the appended claims.

What is claimed is:

1. A method of clock generation for a transmitter comprising:
   receiving an external PLL clock signal and providing a first local clock generator and a second local clock generator for respectively generating first and second divided clock signals;
   generating a synchronization signal for enforcing a phase relationship between the first and second divided clock signals; wherein generating said synchronization signal includes providing a data clock sampler; receiving and sampling a data synchronous clock signal with said data clock sampler and providing sample outputs, and clocking said data clock sampler with the external PLL clock signal; applying said sample outputs to a synchronization pulse generator and generating synchronization pulses; and applying said synchronization pulses to a gated synchronization repower tree, and said gated synchronization repower tree receiving and repowering said rising edge synchronization pulses; and
   applying said synchronization signal to said first local clock generator and said second local clock generator during a clock training period; said synchronization signal including at least one synchronization pulse applied to said first local clock generator and said second local clock generator during the clock training period.

2. A method of clock generation as recited in claim 1 wherein generating said synchronization signal further includes applying a synchronization control signal generated by a clock synchronization control; said synchronization control signal for allowing at least one synchronization pulse to be applied to the first local clock generator and second local clock generator only during the clock training period.

* * * * *